United States Patent [19]
Crossley et al.

[11] 3,843,279
[45] Oct. 22, 1974

[54] STATOR ASSEMBLY FOR GAS TURBINE ENGINES WHICH ACCOMMODATE CIRCUMFERENTIAL AND AXIAL EXPANSION OF ENGINE COMPONENTS

[75] Inventors: Ian Alexander Crossley, Hayes; Geoffrey Eric Kirk, Gotham; Norman Howell Anthony, Hemsby; Derek Robert Bamber, Flint, all of England

[73] Assignees: Rolls-Royce (1971) Limited, London; The University of Technology, Leicestershire, England

[22] Filed: June 15, 1973

[21] Appl. No.: 370,444

[30] Foreign Application Priority Data
June 21, 1972 Great Britain.................... 28936/72

[52] U.S. Cl.................. 415/191, 415/138, 415/214
[51] Int. Cl. ........................... F01d 9/00, F01d 9/02
[58] Field of Search .......... 415/138, 139, 191, 192, 415/214, 216, 217, 218, 134, 160

[56] References Cited
UNITED STATES PATENTS

| | | | |
|---|---|---|---|
| 2,605,997 | 8/1952 | Lombard et al. .................. | 415/138 |
| 2,868,439 | 1/1959 | Hampshire et al. ................ | 415/214 |
| 3,075,744 | 1/1963 | Peterson .......................... | 415/115 |
| 3,394,919 | 7/1968 | Catterfeld ......................... | 415/138 |
| 3,635,577 | 4/1969 | Dee ................................ | 415/214 |

Primary Examiner—William L. Freeh
Assistant Examiner—L. J. Casaregola
Attorney, Agent, or Firm—Cushman, Darby & Cushman

[57] ABSTRACT

An aerofoil member for static operation in a gas turbine engine is provided with a shroud and root, one of which has a concave supporting surface formed thereon and the other a convex supporting surface thereon. Both of the surfaces are on that end of the member which faces downstream in operation.

Such an aerofoil member is relieved of major bending and tensile loads thereby enabling it to be constructed from ceramic materials.

5 Claims, 5 Drawing Figures

STATOR ASSEMBLY FOR GAS TURBINE ENGINES WHICH ACCOMMODATE CIRCUMFERENTIAL AND AXIAL EXPANSION OF ENGINE COMPONENTS

This invention concerns aerofoil members for gas turbine engines and mounting means therefor.

It has been proposed to use ceramic materials for the aerofoil members of gas turbine engines, since these materials possess advantageous properties particularly with regard to their resistance to high temperatures and thermal shock. However, the materials are brittle and must be relieved of excessive bending loads and tensile loads, and it has been difficult to devise a suitable mounting.

The present invention comprises an aerofoil member and a mounting therefor which enable the blade to be relieved of major bending and tensile loads.

According to the present invention there is provided an aerofoil member for static operation in a gas turbine engine, said aerofoil member having a shroud and a root one of which has a concave supporting surface formed thereon and the other a convex supporting surface formed thereon, both of said surfaces being at that end of the member which faces downstream in operation.

Preferably said convex surface is part-cylindrical, while said concave supporting surface may comprise a part-cylindrical recess.

The convex surface may be on the shroud, while the concave surface may be on the root.

Either or both of the shroud and root may be provided with a flat side surface or surfaces which are adapted to abut against retaining means which restrain sideways motion of the member.

The invention also includes mounting means for the aerofoil member comprising a flat upstream-facing surface which said convex surface abuts in line contact, and a projecting surface upstream of the part of the member having the convex surface and adapted to limit upstream movement of the vane. This arrangement may be repeated at the other end of the aerofoil member, where there may be a convex part-cylindrical upstream facing member adapted to engage with the concave surface to retain the member against axial movement and a second projecting surface upstream of the part of the member having the concave surface and adapted to limit upstream movement of the vane and to prevent disengagement between the concave surface and the part-cylindrical member.

To limit sideways motion of the aerofoil members there may be projecting retaining members adapted to abut against at least one side face of each said aerofoil member to limit circumferential motion of the member.

The invention also comprises a gas turbine engine having an aerofoil member in accordance with the above statements.

It is to be understood that the terms "upstream" and "downstream" are used in relation to the direction of flow of gases through a gas turbine engine during operation thereof. It is to be further understood that the terms "radially inner" and "radially outer" are used in relation to a plane perpendicular to the longitudinal axis of a gas turbine engine.

The invention will now be particularly described by way of example only with reference to the accompanying drawings in which.

Figure 1:
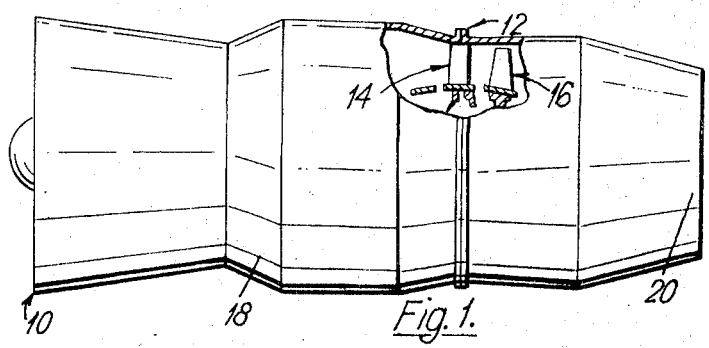
FIG. 1 is a diagrammatic view of a gas turbine engine.

In FIG. 1 a gas turbine engine 10 comprises a compressor and combustion equipment (not shown) and a turbine section 12 which includes a static stage of nozzle guide vanes 14 which is positioned immediately downstream of the combustion equipment, and a rotatable stage of turbine blades 16 immediately downstream of the stage of nozzle guide vanes 14. All of said parts are arranged in flow series and enclosed by a casing 18 which terminates in a gas exhaust nozzle 20. Casing 18 is made up from a plurality of flanged cylinders which are bolted together.

It is known by those skilled in the art to support a stage of nozzle guide vanes 14 between the inner and outer fixed engine structure (with respect to the engine axis of rotation) but as a result, during operation of the engine, the stage of nozzle guide vanes is subjected to considerable stresses resulting from differential expansion of various engine parts which are subject to heat, relative axial movement of said inner and outer structure which movement is caused by gas loads, and twisting or torque stresses, again caused by inter alia, gas loads acting directly on the aerofoil portions of the nozzle guide vanes themselves. However, in the present invention, and as most clearly illustrated in FIGS. 2 and 3 of the drawings each guide vane 14 of the stage of guide vanes is supported in a manner which substantially obviates all of the loads mentioned above, which manner of support will now be described.

Figure 2:
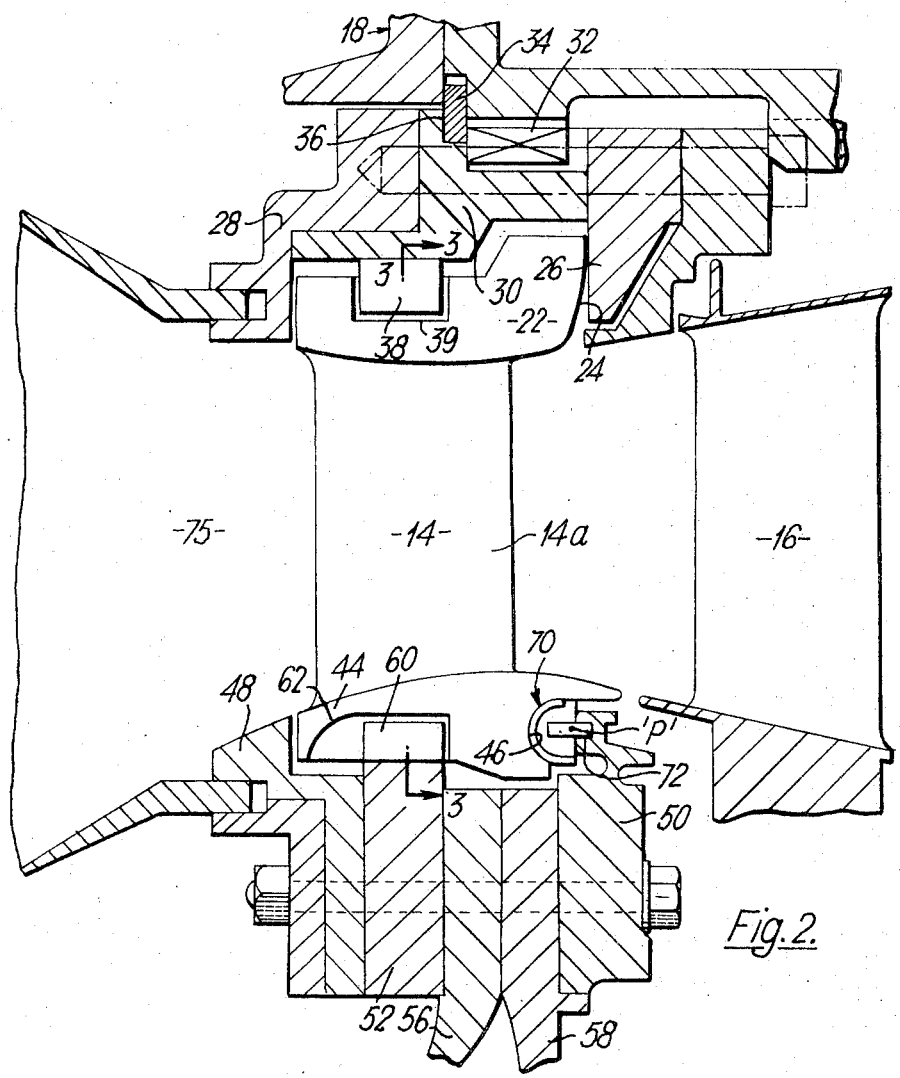
FIG. 2 is a cross-sectional enlarged partial view of said gas turbine engine.

In FIG. 2 the guide vane 14 has at its radially outer end (radially with respect to the engine axis of rotation) a shroud 22 which co-operates with radially outer shrouds on adjacent guide vanes (as in FIG. 3) to form an outer wall of a gas flow annulus and lies between two annular rings 26, 28 the opposing faces of which are flat. The downstream edge face 24 of the shroud is convexly curved in a part-cylindrical fashion and, during operation of the engine, abuts the flat face of annular ring 26 in line contact therewith. The length of shroud 22 between the upstream and downstream edge faces is such that limited free movement of the guide vane 14 is possible within the confines of the opposing faces of rings 26, 28 in a direction axially of engine 10, at least whilst the engine is not operating.

The two annular rings 26, 28 are spaced apart by a further annular ring 30 which has dog and slot features 32 on its outer periphery which locate with similar features on casing 18 so as to prevent relative rotation therebetween.

A stop ring 34 is trapped between two portions of casing 18 and also locates in a groove 36 in ring 30 so as to prevent relative axial movement between casing 18 and the assembly of rings 26, 28 and 30.

Figure 3:
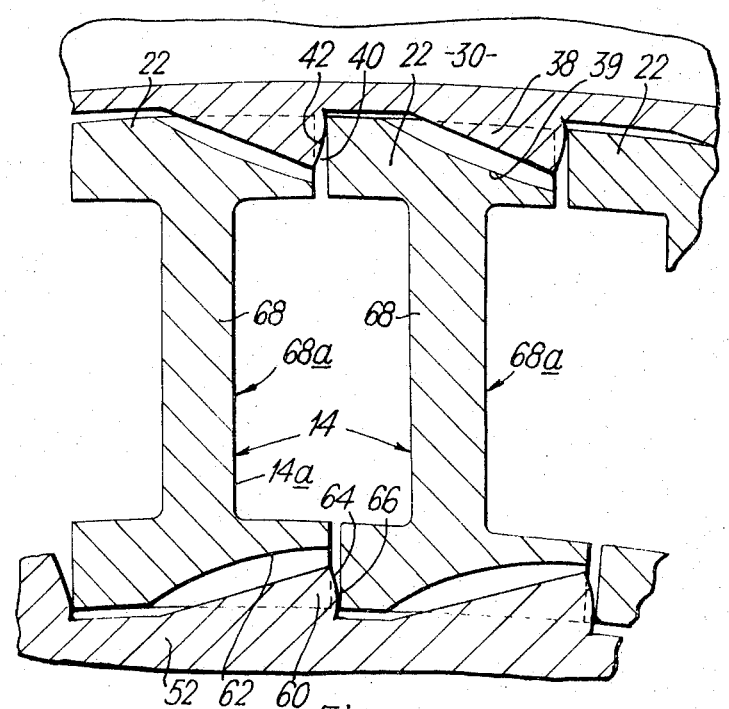
FIG. 3 is a view on line 3—3 of FIG. 2.

Ring 30 has a plurality of teeth 38 formed on its inner periphery, the number of teeth being equal to the number of guide vanes 14 in a complete stage thereof. Each tooth 38 has one flank 40 which is convexly curved and, during operation of the engine each convexly curved tooth flank 40 is abutted by one flat side edge 42 of the shroud 22 of a respective guide vane 14, (FIG. 3). Moreover, each tooth 38 is received in a groove 39 in a respective guide vane shroud in nonengaging manner, the shroud in which it is received being the one belonging to the vane next to the vane whose side edge is abutted by the flank of that tooth.

Each guide vane 14 has at its radially inner end (radially with respect to the engine axis of rotation) a platform 44 which co-operates with radially inner platforms on the remainder of the guide vanes in the stage so as to form the inner wall of the gas flow annulus mentioned herein. The downstream edge face of each platform has a linear part-cylindrical recess which extends in a direction which is chordal with respect to a hypothetical arc struck on a plane transverse to and centred on, the engine axis of rotation. The bottom 46 of the recess is semi-circular in cross-section, (FIG. 2).

The vane platforms 44 are located between a pair of annular rings 48, 50 which in turn are axially separated by a further ring 52 which is toothed in the manner of ring 30, and a pair of discs 58, 56 all of which are bolted together. Discs 56, 58 may be further connected to bearing housings (not shown) formed therein in known manner, the bearings housing rotatably supporting the turbine shafts (not shown) of the engine 10.

Each tooth, designated 60, on ring 52 locates in a groove 62 in a respective platform 44 and its convexly curved flank 64 (FIG. 3) during operation of the engine, abuts a side edge 66 of an adjacent guide vane. It will be noted on reference to FIG. 3 that the shroud and platform side edges which the teeth abut are on the same side of the aerofoil portion 68 of guide vane 14.

Each guide vane 14 is pivotally mounted on a semi-cylindrical bar 70 the flat of which abuts a face of annular ring 50 in gas sealing engagement and which is located thereon by a dowel pin 72 which in turn is pivotally mounted in ring 50. Bar 70 is relieved on either side of a mid portion 74 so as to provide only a very small area of contact between mid portion 74 and the surface of recess 46 thus maintaining friction between the vane and bar at a minimum.

Figure 4:
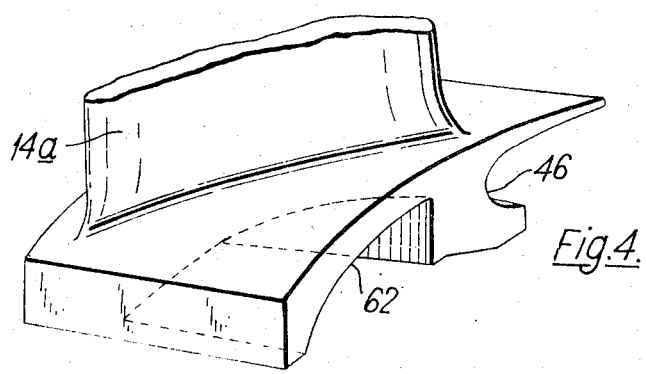
FIG. 4 is a pictorial partial view of a nozzle guide vane.
Figure 5:
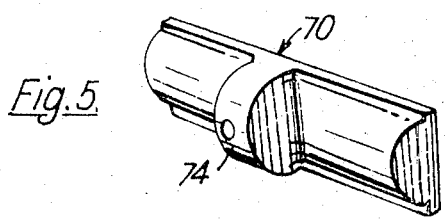
FIG. 5 is a pictorial, enlarged view of a member depicted in FIG. 2.

In FIG. 4 the groove 62 and recess 46 are shown pictorially and in FIG. 5 semi-cylindrical bar 70 is also shown pictorially.

The fit of the platform 44 of each vane between annular rings 48,50 and bar 70 is such as to permit limited movement of each platform during non-operation of engine 10.

OPERATION

On ignition of engine 10, hot gases generated within the combustion chamber will exit from discharge nozzle 75 (FIG. 2) and pass over the aerofoil portions 28 of guide vanes 14 on to turbine 16 to do work thereon. Each vane will become subject to side loads which have the effect of a positive load on side 68a which loads will be transferred to the convex flanks of respective teeth on rings 30 and 52.

Ring 30 is rigidly connected to casing 10, and, as a result will remain static, but ring 52 which is not so rigidly supported, will rotate a small amount in an anticlockwise direction, relative to casing 18. In existing vane mountings this action would exert a bending moment on the guide vanes, but in the present invention each vane merely swings in the manner of a pendulum, their respective flat side edges rolling in line contact over the convex flanks 40, 64 of respective teeth.

As is known in the art, relative axial movement also takes place between the outer ring structure and inner ring structures, i.e., ring structures 48, 52, 56, 58 and 50 move in a direction downstream relative to casing 18 and its associated ring structure. Moreover, during fluctuating engine operating cycles, the movement of ring structure 48, 52, 46, 58 and 50 may be a reciprocating movement. In any event, guide vane 14 will pivot in a plane containing the axis of rotation of engine 10, about a point 'P' which is the centre of arc of the curved surface of recess 46. At the same time the convexly curved downstream edge face 24 of shroud 22 will move in rolling line contact with the flat surface of ring 26.

The gas loads exerted on the guide vanes will keep them pressed against the respective ring and tooth flank surfaces thereby preventing chattering of the assembly despite the loose fit of the vanes in the ring structures. Moreover, the gas load effects will pass through the guide vanes shrouds and platforms to the respective ring structures and their support means. Bending loads on the vanes, which loads are created by relative movements between inner and outer fixed structures within which the vanes are located, are substantially obviated by the vanes abilities to oscillate by virtue of their curved locating surfaces.

It will be appreciated by those skilled in the art that the manner in which vanes 14 are mounted in accordance with the invention as described herein, is an effective manner in which to mount guide vanes which are made from extremely brittle materials such as silicon carbide or silicon nitride which materials, whilst having the ability to withstand extremely high temperatures during operation of an engine in which they are mounted, cannot withstand mechanical stresses which would be exerted upon them by virtue of the mechanical operating conditions and resultant effect as described herein. However it will be further appreciated that metal vanes may also be formed and mounted in the manner described herein.

We claim:

1. A stator assembly for gas turbine engines having a radially inner and a radially outer fixed structure comprising:

an aerofoil member for static operation in said gas turbine engine, and means for mounting said aerofoil member between the radially inner and radially outer fixed structure of said gas turbine engine, said aerofoil member being provided with a radially inner platform and a radially outer shroud and said mounting means including means mounted on said radially inner fixed structure for receiving said radially inner platform and means mounted on said radially outer fixed structure for receiving said radially outer shroud, the downstream end of said radially inner platform or said radially outer shroud being provided with a convex surface, and the downstream end of the other of said radially inner platform or said radially outer shroud being provided with a concave surface, said convex and concave surfaces being adapted for cooperation with corresponding surfaces provided on said radially inner platform receiving means and said radially outer shroud receiving means, said platform and said shroud being loosely mounted in said platform and shroud receiving means so that when said gas turbine engine is in operation, said convex and concave surfaces are urged, as a result of the gas flow through said engine acting upon said aerofoil member, into engagement with said corresponding surfaces on said platform and shroud supporting means, said aerofoil member being permitted to tilt axially relative to said radially inner and outer fixed structure to accommodate relative axial movement between said inner and outer fixed structure.

2. A stator assembly for gas turbine engines as defined in claim 1 wherein first and second retaining means are provided on said outer shroud receiving means and said inner platform receiving means, respectively, to limit circumferential movement of said aerofoil member, said first and second retaining means being provided with convex surfaces adapted to abut flat side edges provided on said shroud and said platform, respectively, said aerofoil member being permitted to tilt circumferentially relative to said inner and outer fixed structure to accommodate relative circumferential movement between said inner and outer fixed structure.

3. The stator assembly for gas turbine engines of claim 2 wherein each of said first and second retaining means comprises a tooth having a convex flank adapted to make line contact with said flat side edges of said platform and said shroud parts of said aerofoil member, each of said platform and said shroud being provided with a grooved portion adapted to receive the tooth which contacts the adjacent aerofoil member when a plurality of said aerofoil members are assembled in an annular array.

4. The stator assembly for gas turbine engines of claim 1 wherein said aerofoil member comprises a ceramic material.

5. The stator assembly for gas turbine engines of claim 4 wherein said aerofoil member comprises a ceramic material selected from the group comprising silicon nitride and silicon carbide.

* * * * *